United States Patent
Thebaut et al.

(10) Patent No.: US 6,381,639 B1
(45) Date of Patent: *Apr. 30, 2002

(54) POLICY MANAGEMENT AND CONFLICT RESOLUTION IN COMPUTER NETWORKS

(75) Inventors: Suzanne Thebaut, Amesbury, MA (US); Walter Scott, Salem; Eric Rustici, Londonderry, both of NH (US); Prasan Kaikini, Cambridge, MA (US); Lundy Lewis, Mason, NH (US); Rajiv Malik; Steve Sycamore, both of Nashua, NH (US); Roger Dev, Durham, NH (US); Oliver Ibe, Andover, MA (US); Ajay Aggarwal, Somersworth, NH (US); Todd Wohlers, Dover, NH (US)

(73) Assignee: Aprisma Management Technologies, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/219,294

(22) Filed: Dec. 22, 1998

Related U.S. Application Data

(63) Continuation-in-part of application No. 08/450,854, filed on May 25, 1995, now Pat. No. 5,872,928.

(51) Int. Cl.$^7$ .............................................. G06F 13/14
(52) U.S. Cl. ...................................... 709/222; 709/221
(58) Field of Search ................................ 709/221, 222

(56) References Cited

U.S. PATENT DOCUMENTS

| 5,509,123 A | * | 4/1996 | Dobbins et al. | 709/243 |
|---|---|---|---|---|
| 5,557,747 A | * | 9/1996 | Rogers et al. | 709/223 |
| 5,838,918 A | * | 11/1998 | Prager et al. | 709/221 |
| 5,872,928 A | * | 2/1999 | Lewis et al. | 709/222 |
| 5,889,953 A | * | 3/1999 | Thebaut et al. | 709/221 |
| 6,167,445 A | * | 12/2000 | Gai et al. | 709/223 |

OTHER PUBLICATIONS

Moffett, Jonathan D. et al.; Policy Hierarchies for Distributed Systems Management; IEEE Journal on Selected Areas in Communication; pp. 404–414, Dec. 1993.*

Kirsten Heiler et al.; Policy Driven Configuration Management of Network Devices; IEEE Network Operations and Management Symposium; vol. 1, pp. 674–689; Apr. 1996.*

* cited by examiner

*Primary Examiner*—Kenneth R. Coulter
(74) *Attorney, Agent, or Firm*—Wolf, Greenfield and Sacks, P.C.

(57) ABSTRACT

Method and apparatus for determining an enforceable policy applicable to one or more network devices. The method includes attaching one or more rule elements to one or more domain elements to create policies, the domain elements representing network devices and groups of network devices, and the rule elements defining actions, a method for determining whether a conflict exists between the polices, and a method for resolving the conflicts to produce one or more enforceable policies.

16 Claims, 14 Drawing Sheets

Configuration Listing for new_config

| Attribute /43 | Value /44 |
|---|---|
| AT_If_Index.2.1.132.177.141.10 | 2 |
| AT_Net_Addr.2.1.132.177.141.1 | 86.8D.8F.1 |
| AT_Phys_Addr.2.1.132.177.141.1 | 0.0.C.4.E3.63 |
| Apps_Created_State | 1 |
| AutoPlaceOffsetX | 0 |
| AutoPlaceOffsetY | 30 |
| AutoPlaceStartx | 100 |
| AutoPlaceStarty | 50 |
| Community_Name | public |
| Condition | 6 |
| Condition_Value | 0 |
| ContactPerson | Lisa |
| Contact_Status | 2 |
| DataRelayClass | 4 |
| Desc_Key_Word | 8.2(4):8.2(5) |
| Dev_Contact_Status | 2 |
| DeviceType | CiscoMIM |
| Device_Name | <No Value> |
| Device_Type | <No Value> |
| Disposable_Precedence | 10 |
| EDIT_COUNT | 1 |
| GeneralDiscClass | 1 |
| SysName | enax |
| System_Oid_Verify | 1.3.6.1.4.1.9.1.5 |
| System_Up_Time | 180337411 |
| TimeOUT | 3000 |
| TryCount | 3 |
| VIB_Display_List | 0.0.0.0.6D.73.0.F8 |
| VIB_Raster_Name | Defaultst.csi |
| Value_When_Orange | 3 |
| Value_When_Red | 7 |

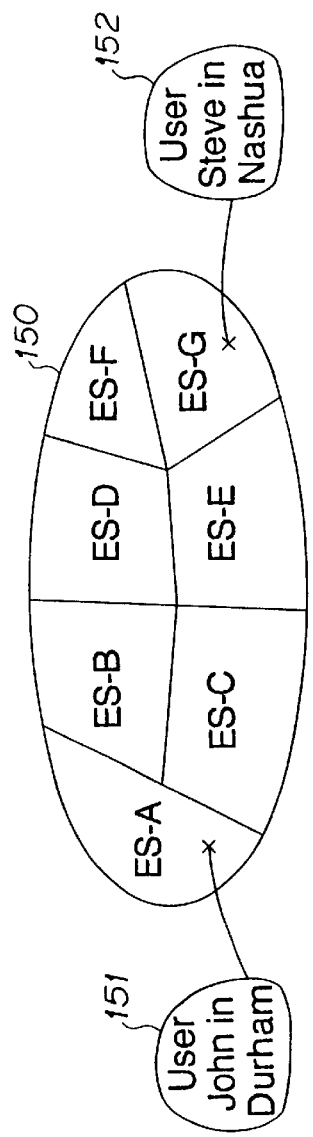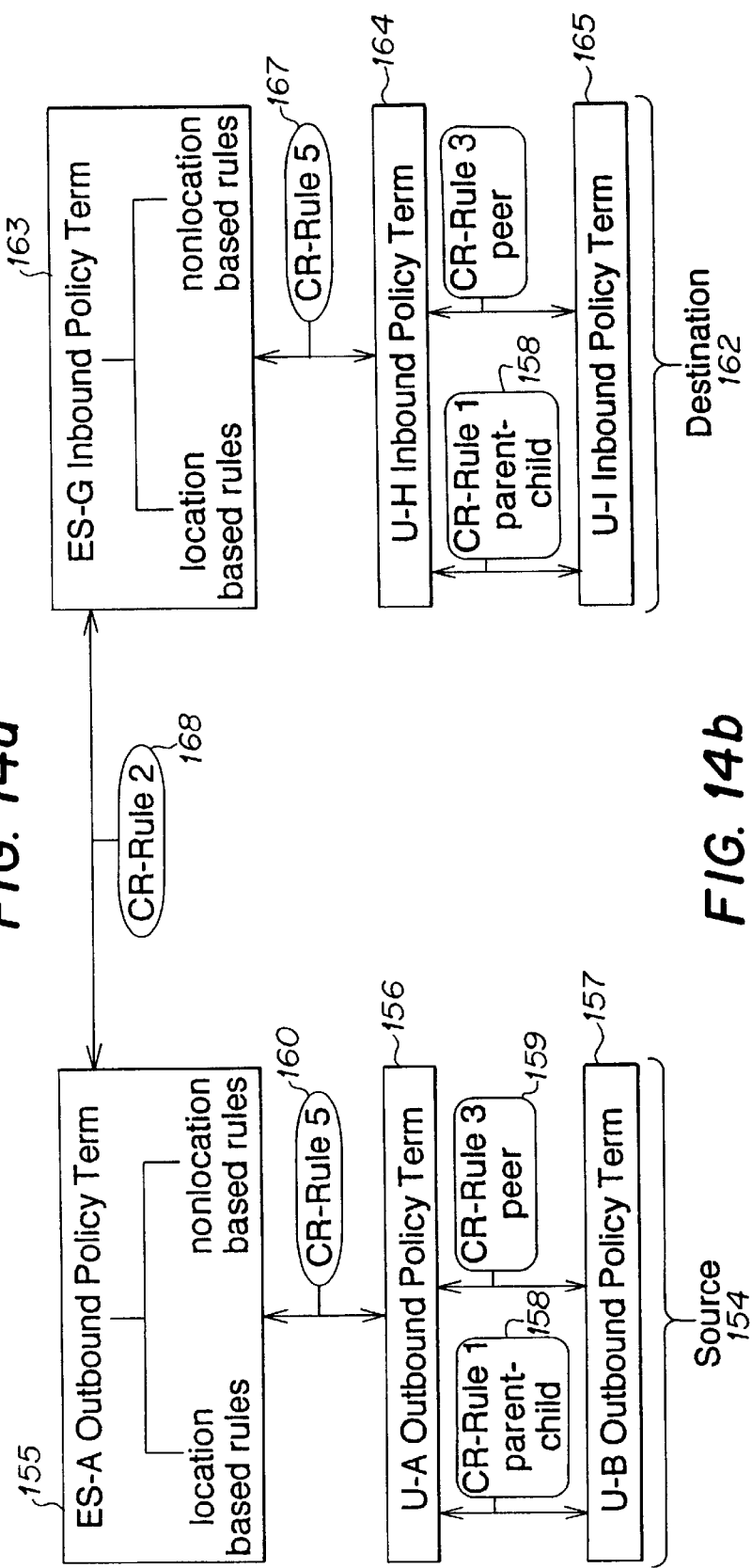
FIG. 14a
FIG. 14b

POLICY MANAGEMENT AND CONFLICT RESOLUTION IN COMPUTER NETWORKS

RELATED CASES

This application is a continuation-in-part of commonly owned U.S. Serial No. 08/450,854 filed May 25, 1995 now U.S. Pat. No. 5,872,928 which is hereby incorporated by reference in its entirety.

FIELD OF THE INVENTION

The present invention relates to policy management and conflict resolution in computer networks, and more specifically to a general policy management architecture and its applications in various network management fields.

BACKGROUND OF THE INVENTION

Computer networks allow increased computing power, sharing of resources, and communications between users. These networks have grown to represent large investments on the parts of businesses, governments and educational institutions and these organizations spend large amounts of time and money maintaining their networks. According to industry research, an average 5000-user corporate network costs more than $6.4 million to support each year. Thus, to many network decision makers the real concern, as we head into the 21st century, is not so much migrating to faster technologies such as asynchronous transfer mode (ATM), but reducing the costs associated with supporting and operating the networks they use today.

One of the principle costs associated with maintaining a network is the time spent on reconfiguration. This is not necessarily the replacement of switches, concentrators, bridges, etc., but the adding, moving and changing of users connected to the network. Simply moving a person from one desk on one floor to another desk on another floor may involve changing router ports, routing tables, IP addresses, making desktop changes and even doing some physical rewiring. According to LAN Times, the average cost of adds, moves and changes on today's router-centric networks has been conservatively estimated at $300–500 per user. With the average company moving each user 1.1 times per year, it is clear where many of the support dollars are going. The administrators overseeing these operations would appreciate a reduction in the time it takes to implement such changes.

As the cost of maintaining networks has risen, the internetworking experts able to oversee such operations are becoming harder to find. Many networks are understaffed to meet the increasing demands placed on them. A management system is needed which allows someone who is not an internetworking expert to perform the more mundane operations, such as moving users around, adding users, or changing the access constraints of specific users.

For example, the ability to connect to a network will often depend on the location from which a user is accessing the network and the destination a user is trying to reach. It is a complicated job to control access between what could be thousands of users, and it is made more complicated by the fact that the same user might access the system from different locations and might need different levels of access as a function of the location. The possible combinations of access increase geometrically because of these "nomadic" users.

Thus, it would be desirable to provide an architecture for a management system for controlling, simplifying and/or automating various aspects of network management so that the cost of maintaining the network, and/or using the network, can be better controlled.

SUMMARY OF THE INVENTION

The present invention provides a framework for implementing policy in network management. In one embodiment, the framework includes a method for defining network domains, a method for defining rules, a method for attaching rules to domains, and a policy driver to monitor objects, execute rules that are attached to the objects, and adjudicate among conflicting rules.

Given this framework, one developing an application in a particular network management area may ask the following questions:

What are the objects in my application?
What are the attributes of the objects?
What (if any) are the ways in which I should group the objects?
Which attributes do I want to monitor and control?
What are the rules in the rule space?
To which objects in the domain are rules attached?
Which events will trigger the policy driver?
What are the actions I want when rules are triggered?

With answers to these questions, one can develop and implement a policy in a particular management application.

In one embodiment, a configuration application is provided with policies that govern:

The addition of users and resources on the network;
The deletion of users and resources from the network; and
Changes in resource operating parameters.

In a second embodiment, an access/connectivity application is provided with policies that govern:

The access rights of users and end stations to databases, applications, and other users and end stations;
Authentication of users (for security); and
Tracking the usage of network resources.

These and other features of the present invention will be more particularly described in the following detailed description and accompanying drawings.

BRIEF DESCRIPTION OF THE FIGURES

FIG. 4 is a schematic illustration of a configuration record;

FIG. 14A is a schematic illustration of a network segmented by end station workgroups, and FIG. 14B is a flow diagram illustrating the resolution of conflicts between various policy terms.

DETAILED DESCRIPTION

1. A Policy Framework

Figure 1:
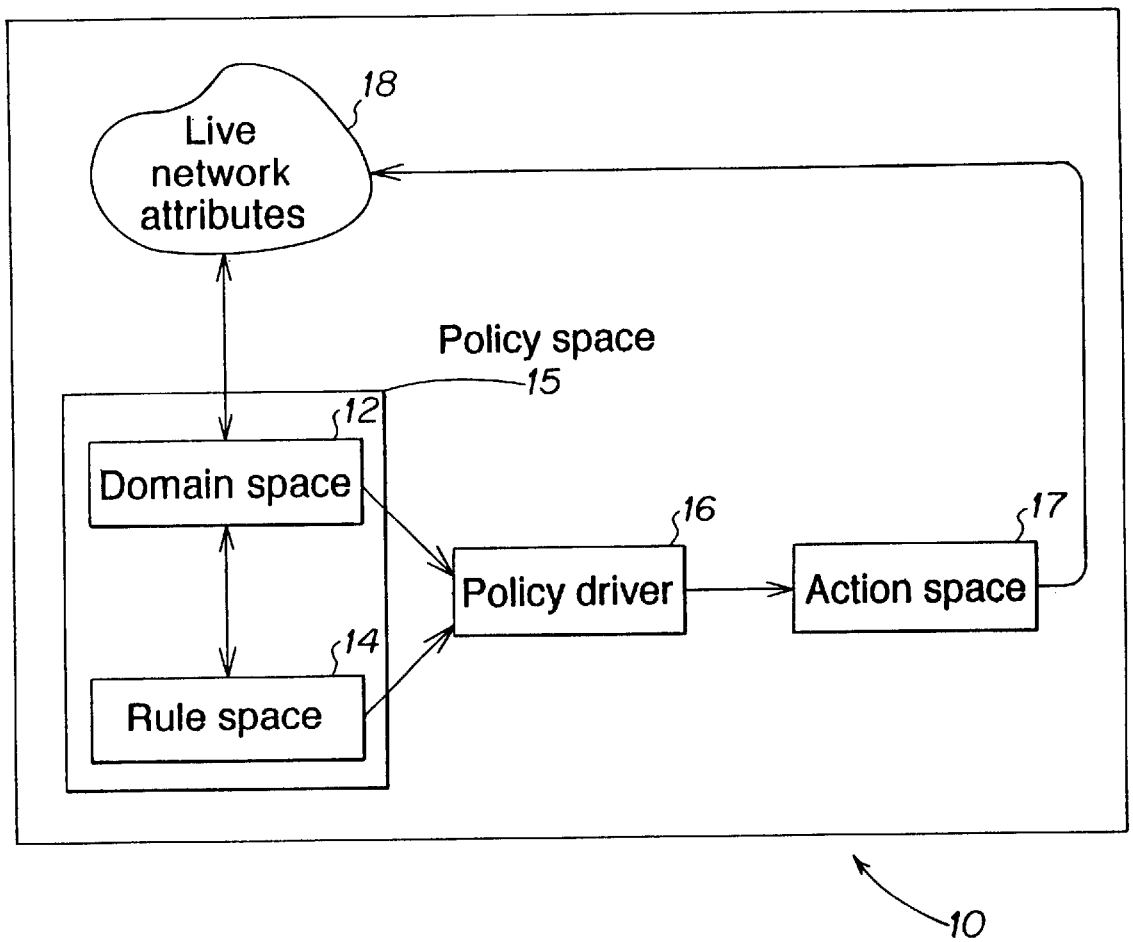
FIG. 1 is a schematic illustration of an apparatus for implementing one embodiment of the policy framework of the present invention.

FIG. 1 shows a policy framework according to one embodiment of the present invention. A domain space 12 and a rule space 14 make up policy space 15, and together provide input to a policy driver 16. The output of the policy driver 16 is an action space 17 which generally brings about an enforcement of a policy in network 18. The network 18 communicates attribute values to the domain space 12.

The domain space 12, at the lowest level of abstraction, consists of objects of interest in the application. Objects are the smallest units in the domain space, and they are defined in terms of their attributes. In access management for example, the objects might be transmissions, where the attributes of transmissions are source Internet Protocol (IP) address, destination IP address, and service type. In fault management, objects might be alarms, where the attributes of alarms are alarm severity, device type, and device location.

At higher levels of abstraction, objects are grouped into domains. A particular grouping principle depends on the objects of interest in the application and the attributes of the objects. Possible domains in access management include all transmissions of service type X, or all transmissions whose destination IP address is the masked address XXX.XXX.XXX.O. Possible domains in fault management include all red alarms, or all alarms in Building 2. The domains include both objects and other domains, as one domain may be a member of another domain.

The rule space 14 consists of if-then rules, where the left-hand side of the rule is written in terms of the attributes of objects in the domain space, and the right-hand side is an action. For example, a rule in fault management might be: "If an alarm is red, then forward the alarm parameters to the trouble ticket application." In a security application, an example of a rule is: "If the transmission source is X and the transmission destination is Y, then block the transmission."

The elements of the action space 17 are just the right-hand sides of the rules in the rule space. Actions are dependent on the application. They may include permission or forbiddance of an operation on the network, the modification of attributes in other objects, the display of a console message, or an entry in a log file. For example, there might be just two kinds of actions in fault management: forward an alarm to an external application X, or discard the alarm.

It is important to note that a policy in this framework is the attachment of a rule or rule set to an element of the domain space. Thus, a policy is inherently a two-place relation, such as, "attaches to." For example, the statement "All kids have to be in bed by 8 p.m. or else" is a rule, but "All kids have to be in bed by 8 p.m. or else and this applies to you" is a policy.

The functions of the policy driver 16 are to:

monitor the attributes of objects in the domain;

compare the values of attributes with the left-hand sides of rules;

resolve conflicts when two or more rules are applicable to the same object; and execute the right-hand side of a selected rule.

In general, the policy driver is triggered by an event, and takes an element in the domain space 12 as a parameter. In fault management, the policy driver can be triggered by an alarm, and the parameter is just the alarm. In configuration management, the policy driver can be triggered by a device being switched on, and the parameter is the name of the device.

The operation of the policy driver 16 is as follows:

For domain element E do:

1. Collect all domains D of which E is a member (either directly or indirectly).
2. Collect the rules that apply to each domain D (if any), plus the rules for E (if any).
3. Resolve any conflicting rules, producing an enforceable rule set.
4. Execute the action of each rule in the enforceable rule set.

Conflicts occur when two rules issue two inconsistent actions. Consider FIG. 2, which illustrates a data structure (20) for one example of a domain space (21), a rule space (22) and a policy space (23). If the policy driver is triggered for Object 1 (24), and Object 1 inherits policies from parent Domain 1 (26) and grandparent Domain 2 (28), it is possible that Rule 1 (25) and Rule 2 (27) are triggered and that they have inconsistent actions. The purpose of the conflict resolution strategy is to adjudicate what happens.

Note that conflict resolution strategies are a form of "metapolicy" about policies. There are several ways to specify such strategies in a generic way in order to resolve conflicts. Possible strategies include the following:

Before runtime:

Disallow overlapping domains, thereby precluding the possibility of conflicts.

Uncover possible conflicts and resolve them via verification/validation algorithms.

During runtime:

Select the rule that issues from the most specific domain element.

Select the rule that issues from the least specific domain element.

Select the rule that satisfies the largest number of conditions.

Report conflicting rules to a user and allow the user to adjudicate.

Select the rule according to a predefined priority ranking of rules.

Figure 2:
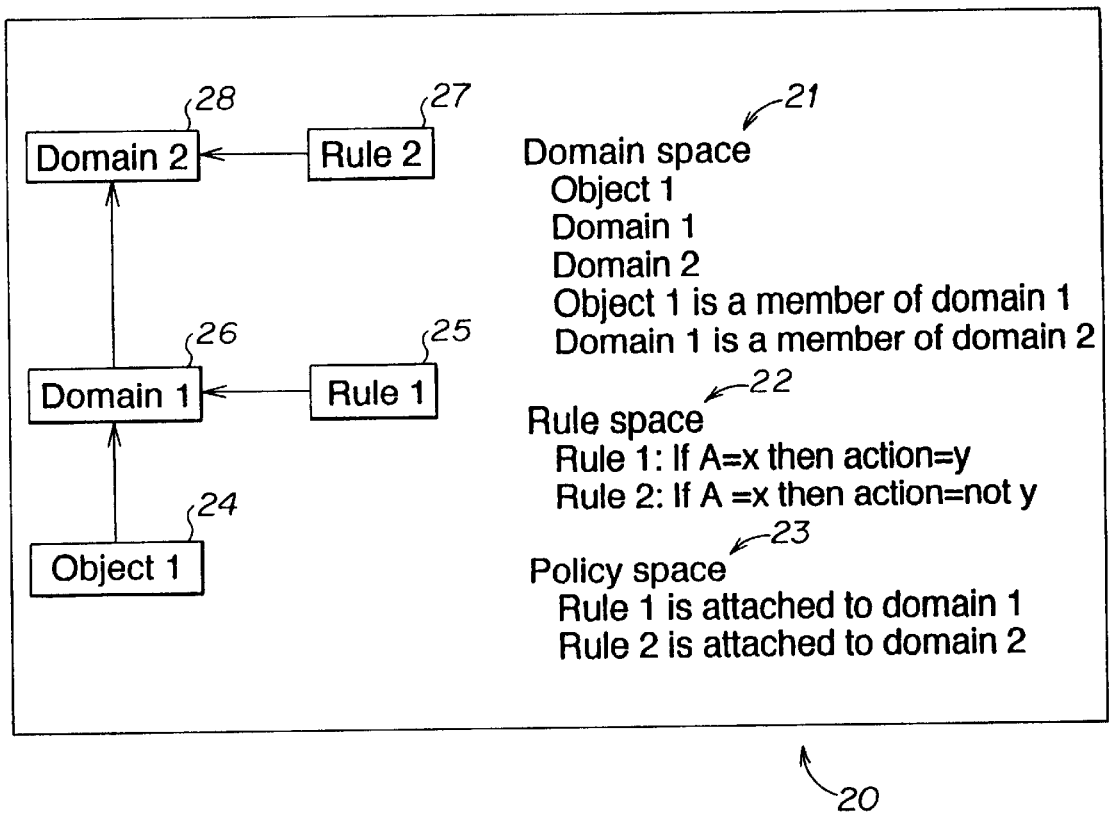
FIG. 2 illustrates a data structure for one example of a domain space, a rule space, and a policy space according to one embodiment.

For the situation in FIG. 2, for example, the strategy "Select the rule that issues from the most specific domain element" would select Rule 1.

A single iteration of the policy driver over the policy space may result in actions that change the attributes of elements in the domain. On subsequent iterations of the driver, other policies may be applicable and thus change other attributes.

2. Implementing Policy For Device Configuration Management (CM)

In this section there is described a policy-based configuration manager (PCM) for enterprise networks. The PCM monitors and controls the configuration of network devices with respect to a prescribed policy. The application will modify configurations (if needed) under alternative network scenarios, including for example, when a device is added to the network and switched on, when network traffic becomes overstressed, and when an administrator wishes to perform a spot check on the network configuration.

Figure 3:
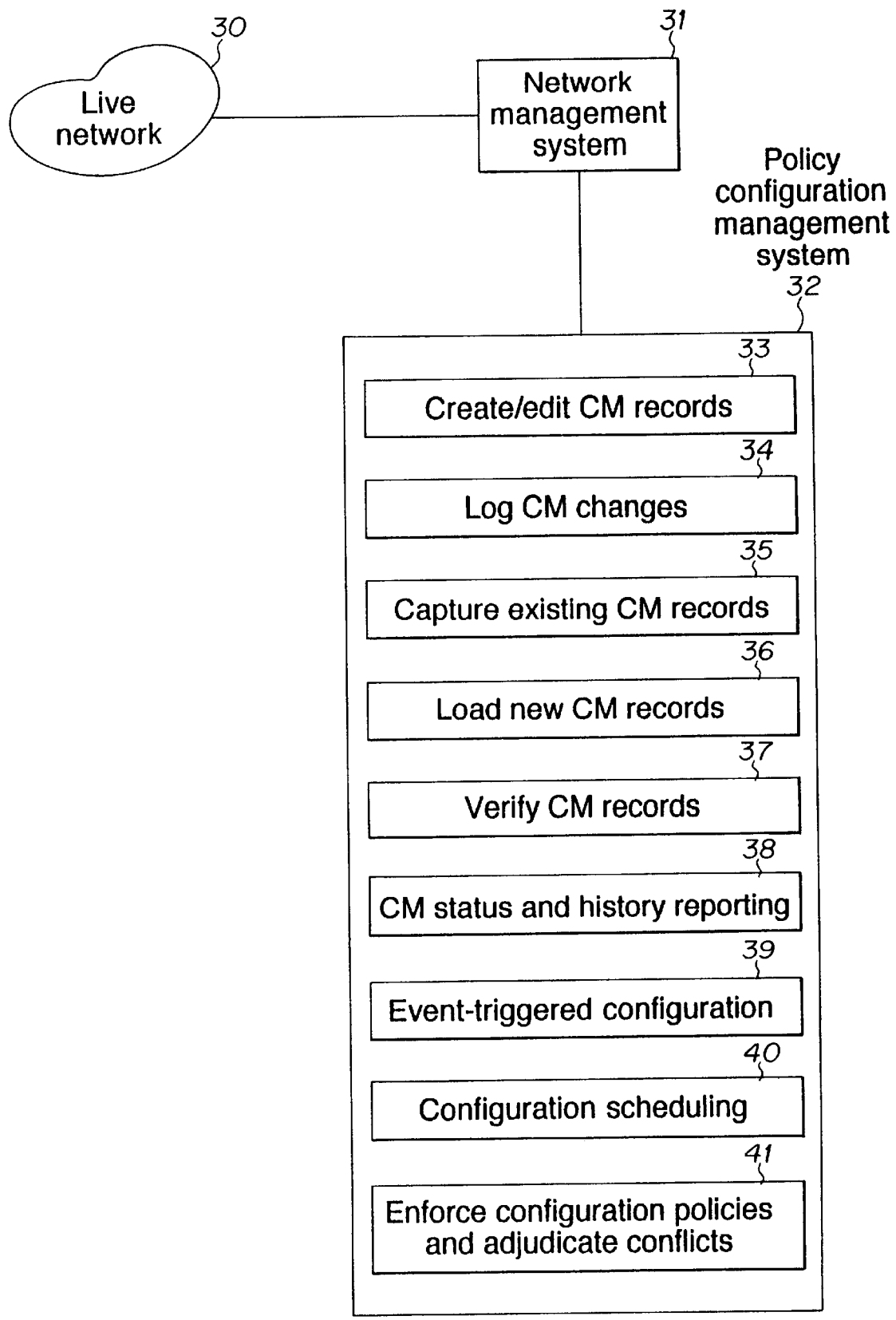
FIG. 3 is a schematic illustration of an apparatus for implementing the policy configuration management system according to one embodiment of the invention.

The embodiment described herein utilizes the Spectrum® Network Management Platform and the Spectrum® Configuration Management System from Cabletron Systems, Inc., Rochester, N.H. These applications provide the necessary underpinnings for the PCM, including device modeling, management information base (MIB) compilation, and interfaces for monitoring and controlling devices based on ISO standards. The system is illustrated in FIG. 3.

A live network 30 communicates with the a network management system 31, which in turn communicates with a policy configuration management (PCM) system 32. The PCM provides the following functions:

- create/edit CM records (33)
- log CM changes (34)
- capture existing CM records (35)
- load new CM records (36)
- verify CM records (37)
- CM status and history reporting (38)
- event-triggered configuration (39)
- configuration scheduling (40)
- enforce configuration policies and adjudicate conflicts (41)

These functions are described in greater detail below.

Device configuration management in communications networks generally includes the tasks of keeping an inventory of network devices, knowing/verifying the configuration of each device, resetting or updating configurations as the need arises, and scheduling configuration changes.

A configuration is a set of particular values of attributes that govern the operational characteristics of a device (e.g., port thresholds, on/off switches, access, security, etc.). Devices that are reconfigured routinely in communications networks are routers, switches, bridges, and hubs.

A configuration record is a copy of a configuration for a particular device. FIG. 4 shows an example of part of a configuration record 42 for a Cisco® router (Cisco Systems Inc., Menlo, Calif.). The configuration record includes a list of attributes 43 and their corresponding values 44. A configuration record may be obtained by interrogating a selected device through a template, or by manual construction and editing. The apparatus for doing so exists in the Spectrum® Configuration Manager. Note that a configuration record may consist of a list of records that are desired to be in effect for particular devices in a domain. For example, a compound configuration record might consist of a record for SGI workstations and another record for Cisco routers.

A configuration policy expresses a relation between a configuration record and a device; the expression "attaches to" represents this relation. For example, a policy could be that a network administrator wishes a particular configuration record (i.e., rule) to be in force for a particular device (i.e., object), regardless of whether the current configuration of the device is equivalent to the desired configuration record.

The PCM includes the following components:
- an apparatus for defining a domain space;
- an apparatus for defining configuration records (a rule space);
- an apparatus for attaching configuration records to elements in the domain space to create configuration policies; and
- a policy driver for monitoring and enforcing configuration policies.

The elements in the domain space are network devices such as hubs, bridges, routers, and workstations. Domains are constructed in accordance with an organizational principle by which devices are grouped in the network. In general, network devices may be grouped in any way that serves as an aid in understanding and managing the network. Common grouping principles include grouping with respect to topology, device type, location, managerial domains, and/or the organizational structure of a network enterprise.

Figure 5:
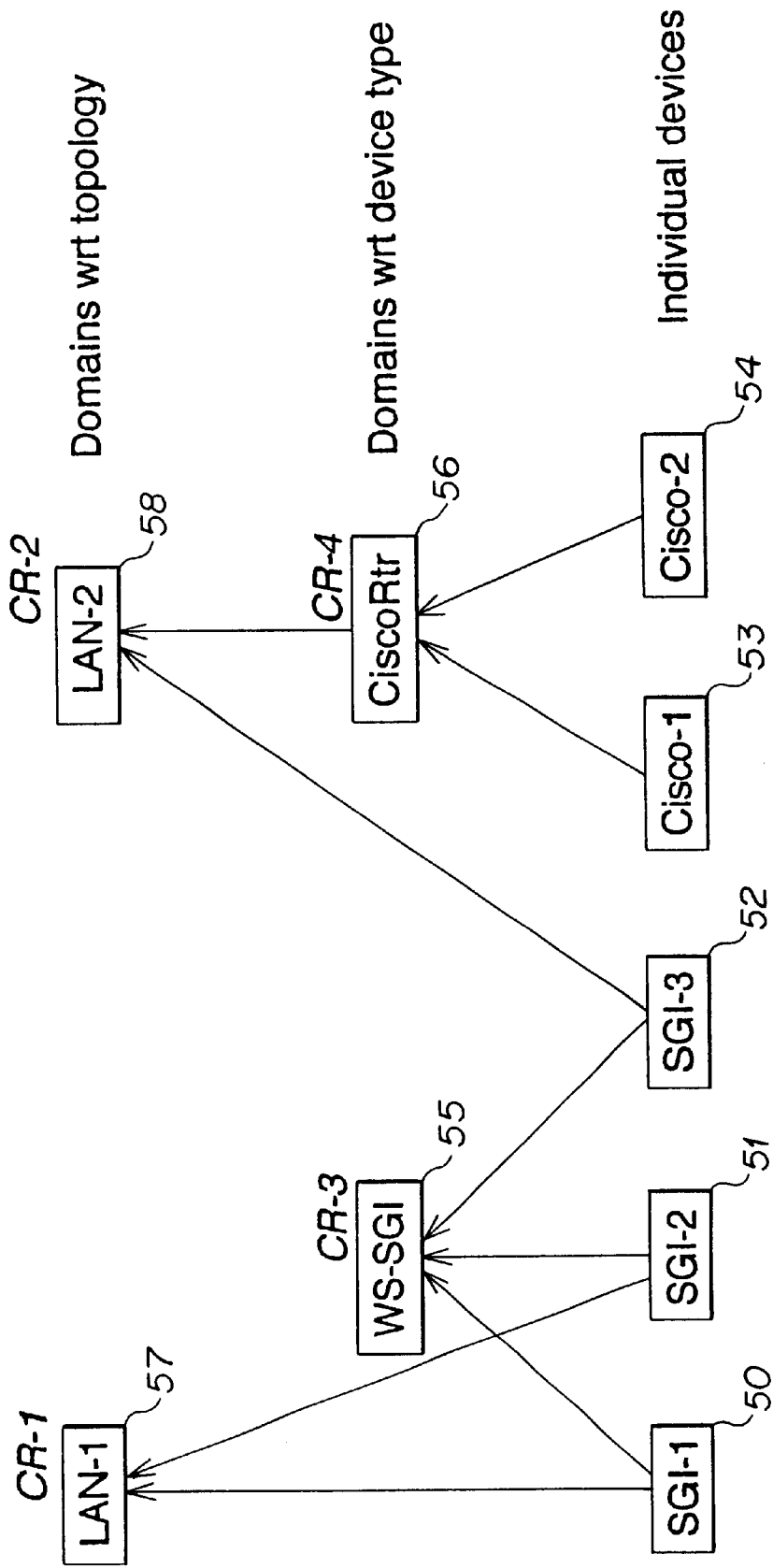
FIG. 5 is a schematic illustration of network devices grouped by domain with respect to device type and topology.

The data structure that records domain membership is of the form "X is a member of Y," where X identifies a device or a domain, and Y identifies a domain. FIG. 5 shows for example five individual devices (50–54) which are grouped in a two-level grouping structure: 1) domains (55, 56) with respect to device type (WS-SGI and CiscoRtr); and 2) domains (57, 58) with respect to topology (LAN-1, LAN-2). The arrows in the figure represent "is a member of" links.

Configuration policies are attachments of configuration records to elements of the domain space. In FIG. 5, a policy is represented by the expression "CR__" resting on top of an element in the domain space (i.e., CR-1, CR-2, CR-3, CR-4).

The general form of a configuration policy is "X is attached to Y with Ordering Index I if Conditions conditions1, condition2, . . . " where X is a configuration record, and Y is an element in the domain space. The Ordering Index and Conditions parameters are optional. The former controls the order in which configurations are loaded into a device, and the latter constrains the enforceability of the attachments. For example:

POLICY-1

CR-1.1 is attached to Y with Ordering Index 2 if segment__load (Z)>40% and CR-1.1 is not equal to the current configuration of Y.

CR-1.2 is attached to Y with Ordering Index 3 if segment__load (Z)>40% and CR-1.2 is not equal to the current configuration of Y.

CR-1.3 is attached to Y if segment__load (Z)≦40%.

Here, if "segment__load (Z)>40%" is true and neither CR-1.1 nor CR-1.2 match the existing configuration of Y, then configuration record CR-1.1 is downloaded on Y first, then CR-1.2.

Other examples of CM policies include the following:

CR-1.4 is attached to LAN-1 if Conditions "the time is between 8 a.m. and 5 p.m."

CR-1.5 is attached to LAN-1 if Conditions "the time is between 5 p.m. and 1 a.m."

Figure 6:
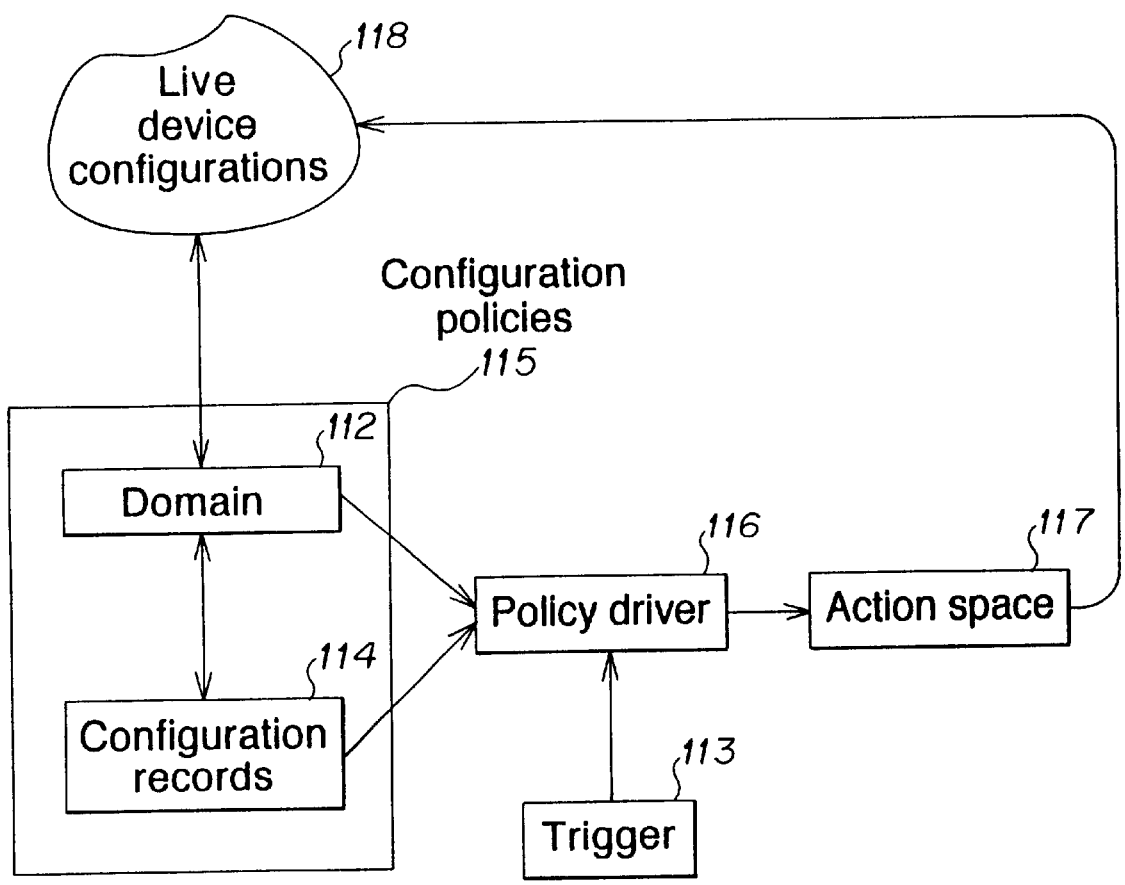
FIG. 6 is a schematic illustration of an apparatus, similar to FIG. 1, relating to an embodiment for device configuration management.

As shown in FIG. 6, the function of the policy driver 116 is to monitor objects in the domain space 112 and to enforce configuration policies 115. The inputs to the driver are a trigger 113, a domain structure 112, and a set of configuration records 114 attached to elements in the domain space. The output of the driver is an action space 117 (ultimately sent to network 18 or to the network management system 31 in FIG. 3). which may comprise one or more of:

- a configuration load;
- a notice of conflicting configurations;

a notice of "no action required"; and a report of the state of overall network configuration. These outputs are user-selectable.

The policy driver may be triggered by one or more of the following events:

a device goes up or down;

a new device is added to the network;

the network goes up or down;

a scheduler triggers the driver; and a user manually triggers the driver.

The operation of the driver 116 is a modification of the general operation of driver 16 described in the previous section:

For domain element E:

1. Collect all domains D of which E is a member.
2. Collect the CRs that attach to each domain D (if any), plus the CRs for E (if any).
3. From each collected CR, pick out those that attach to the individual devices that are members of E.
4. Resolve any conflicting attachments, producing one total enforceable configuration record (ECR).
5. Do one of the following (user-selectable):
   Appeal to the administrator with conflict explanation and recommendation (supervised control).
   Load the ECR into the devices in E and report the transaction (unsupervised control).

Steps 1 to 3 are performed by cycling through a network grouping structure following "is a member of" links and collecting attachments for E recursively with prevention of infinite loops. One method for preventing infinite loops is to keep a record of where you have been and stop if thou revisit the same spot. Step 4 is performed by the conflict resolution strategy incorporated into the policy driver. Step 5 is performed by the existing Spectrum Configuration Manager software.

Configuration conflicts occur when two configuration records issue enforcements for two nonidentical values of a single device attribute. The purpose of the conflict resolution strategy is to adjudicate when this happens. For example:

CR-2 issues AT_If_Index.2.1.132.177.141.102

CR-4 issues AT_If_Index.2.1.132.177.141.104

There are several strategies one may employ to resolve such conflicts. The PCM provides the following strategies, which are user-selectable:

1. Select the value that issues from the CR which is attached to the most specific network domain.
2. Select the value that issues from the CR which satisfies the greatest number of conditions.
3. If both #1 and #2 issue conflicts, favor #1.
4. Report conflicting attachments to a user and allow the user to adjudicate among conflicts.

These strategies reflect the common-sense notion that the exception overrides the rule. If this strategy is not acceptable, the burden of conflict resolution rests with the user of the system.

3. Implementing Policy For Virtual Network Services (VNS)

In this section there is described a policy-based collection of services that provide command, control and connectivity in a connection-oriented switched network hi environment, hereinafter "Virtual Network Services" (VNS). The environment may include switches from various vendors and may encompass multiple technologies, such as ATM switches and LAN switches. The system integrates both physical network management and logical network management, and eliminates the need for a highly-skilled networking expert to perform routine operations.

Figure 7:
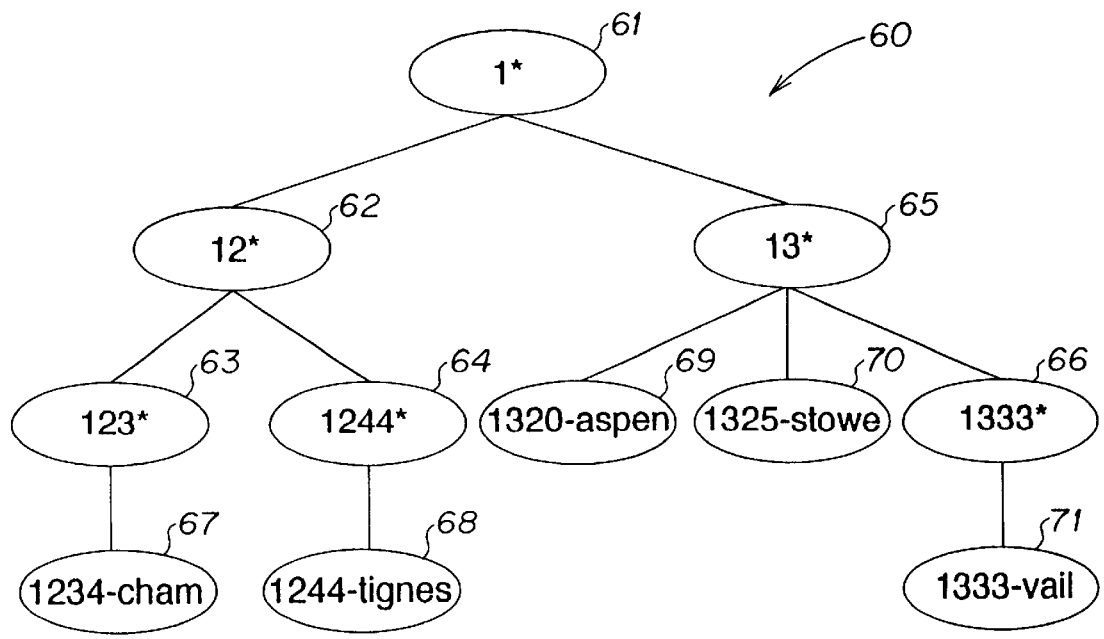
FIG. 7 is a schematic illustration of a topological domain.
Figure 8:
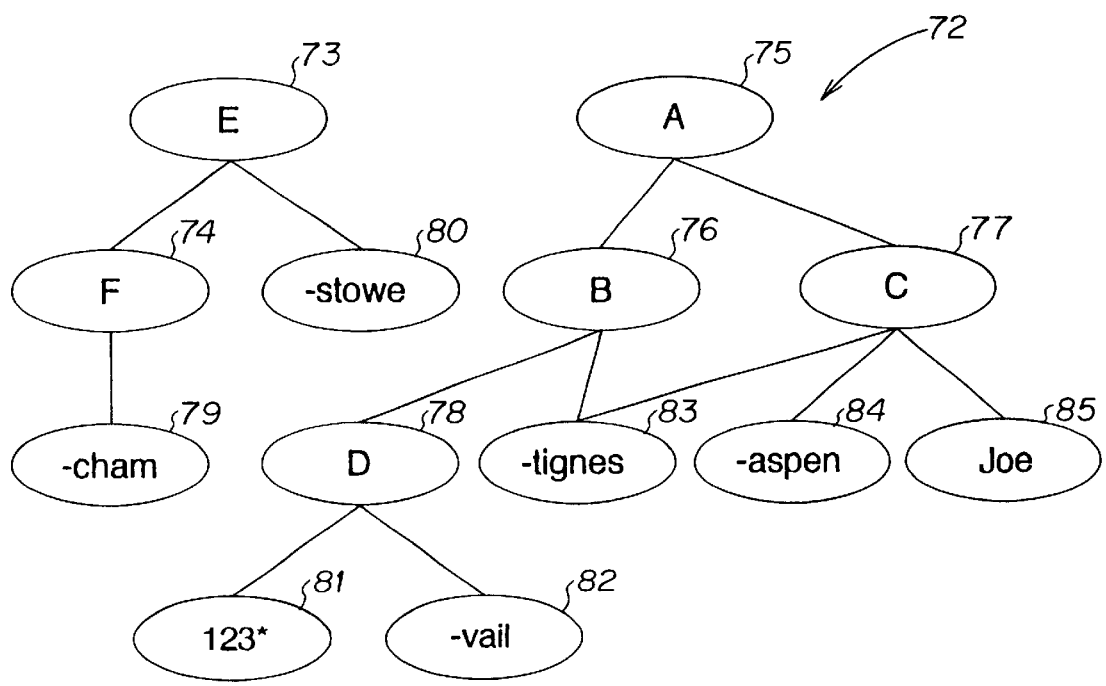
FIG. 8 is a schematic illustration of a logical domain.

In this embodiment, there are defined both topological domains, as shown in FIG. 7, and logical domains, as shown in FIG. 8. A topological domain, also known as a numbering-plan workgroup, represents all end-stations within a topological area defined by a physical address prefix. In FIG. 7, see for example the tree 60 of topological groups 61–66 (1*, 12*, 13*, 123*, 1244* and 1333*) and end-stations 67–71 (1234-cham, 1244-tignes, 1320-aspen, 1325-stowe, and 1333-vail). A fully expanded address prefix, plus an end system identifier (e.g., for LAN systems, a MAC address), represents an end-station. Topological domains are naturally and purely hierarchical.

As shown in FIG. 8, a logical domain 72 is an arbitrary grouping of elements (objects or domains) which are included independent of their location in the network. The logical workgroups 73–78 (A, B, C, D, E, F) are not necessarily hierarchical in nature and therefore objects may be directly contained by multiple logical workgroups; e.g., the object -tignes is contained by both of logical workgroups B and C. Recall from FIG. 7, that -tignes is (currently) a part of the topological domain 1244*. The topological groups/ end stations 81–84 shown in FIG. 8 include "123*, -vail, -tignes, -aspen" and a user 85 "Joe" (the end stations are shown without their topological address prefixes).

Figure 9:
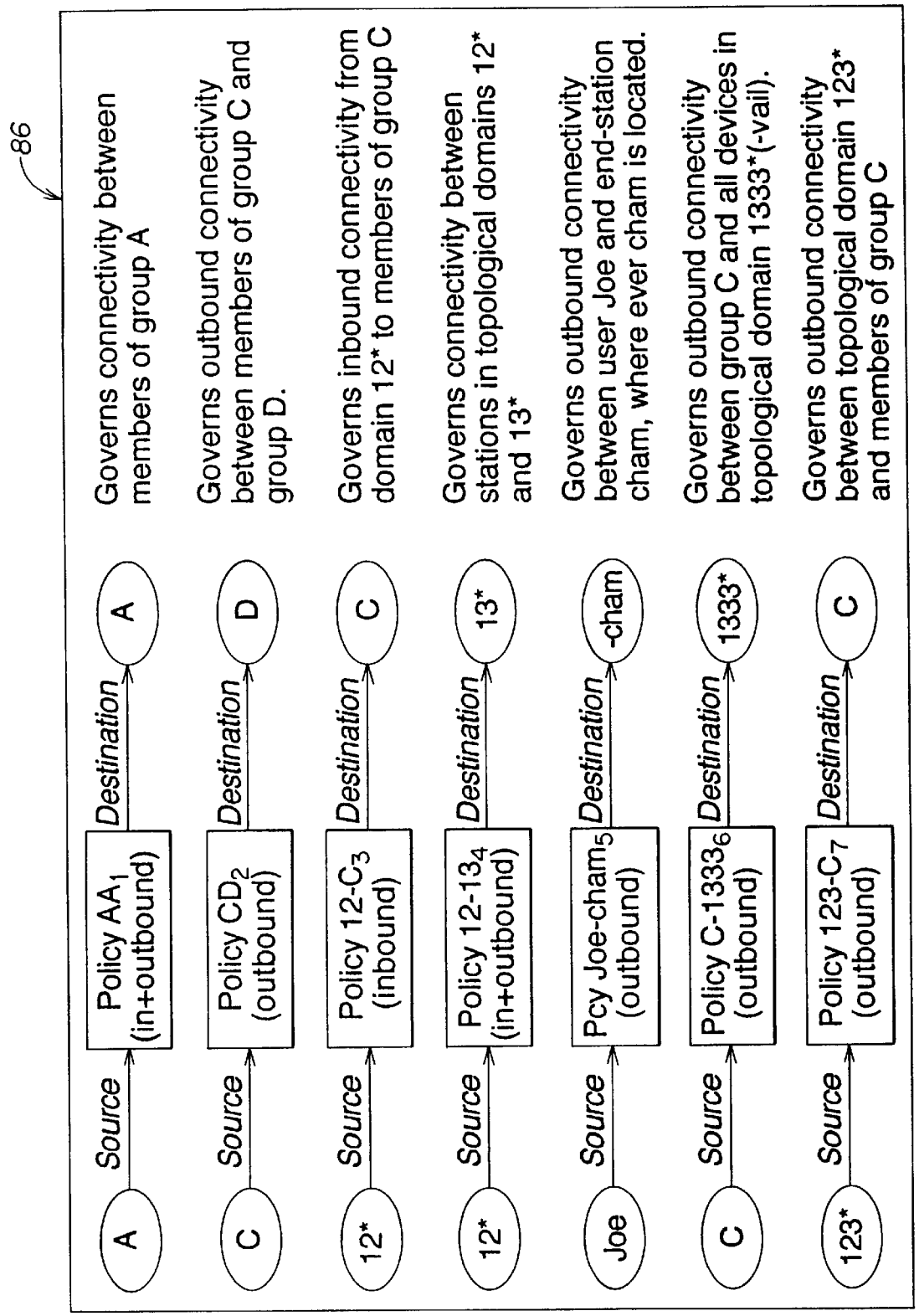
FIG. 9 is a schematic illustration of the various types of policies attached to source and destination pairs.

In this embodiment, policies govern the connectivity between network endpoints and control various aspects of how connections are processed. A policy is created when a rule is attached to a source object and a destination object. Source and destination objects may be any two objects, or they may be the same object. In addition, policies are designated as "inbound" or "outbound". Outbound policies govern the outside access of the source object; they prevent or enable connections originating from the source object. Inbound policies protect the resources of the destination object by governing inbound connectivity. FIG. 9 is a listing 86 which includes a number of representative policies, which are inbound, outbound or both, as applied to a source-destination pair in the topological domains and logical domains of FIGS. 7–8.

Figure 10:
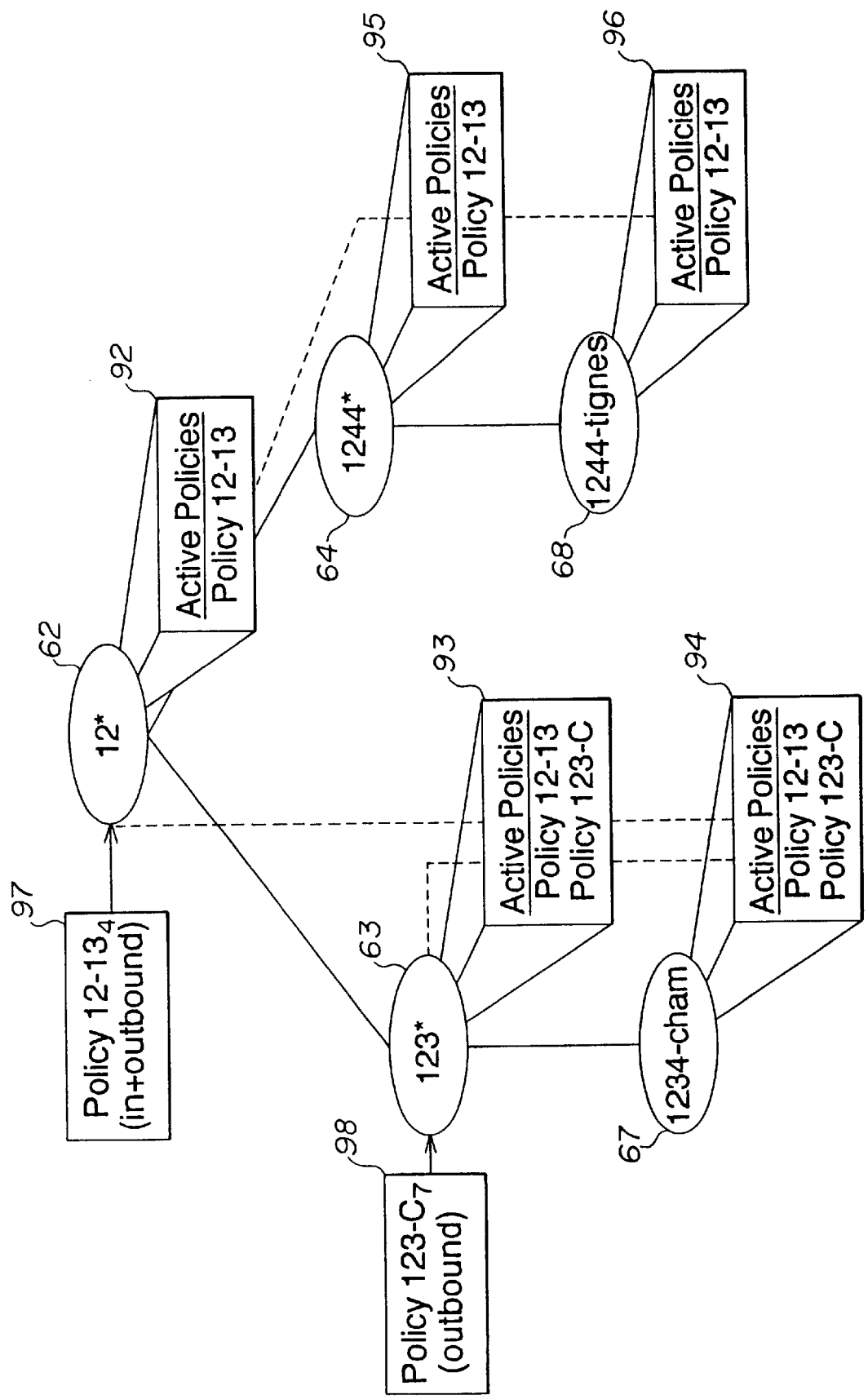
FIG. 10 is a schematic illustration of a portion of the topological domain of FIG. 7, with the addition of policies.

As illustrated in FIG. 10, an object inherits from its topological parent by reason of the pure hierarchical nature of topological domains, e.g., end station 1244-tignes inherits policies 12 and 13 from parent domain 12*. An end-station must necessarily operate within the limitations, of policies associated with the section of the network to which it is attached. This is accomplished by the end-station automatically inheriting the policies applied to the topological domain covering that section of the network. FIG. 10 illustrates a portion of the topological domain of FIG. 7, with the domain elements 62–64 and 67–68 in ovals, the policies 97–98 in rectangles, and the active policies (92–96) for each domain element extending from the respective element with dashed lines to show inheritance.

Figure 11:
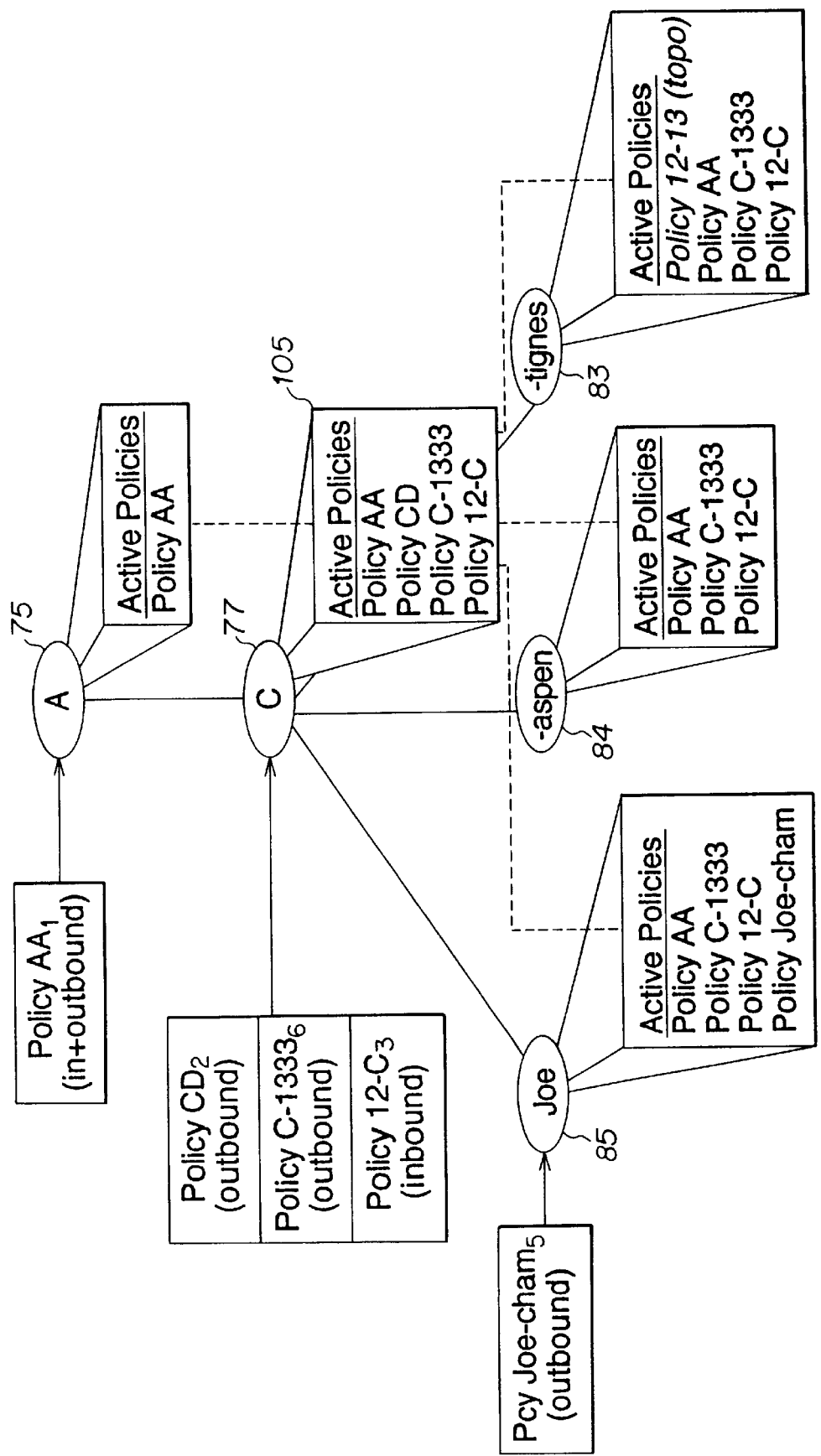
FIG. 11 is a schematic illustration of a portion of the logical domain of FIG. 8, with the addition of polices.

As illustrated in FIG. 11, polices associated with the elements of a logical domain are tied to those logical objects. Therefore, policies inherited by users and end-stations from logical domain parents will apply to those users and end-stations regardless of the topological domain in which they are attached. As used herein, "user" is a logical representation of a human being or application which uses any of the policy-managed end stations. As noted in FIG. 11, which illustrates a portion of the logical domain of FIG. 8, and shows active policy inheritance in a manner similar to FIG. 10, the end-station -tignes (83) inherits active policies AA, C-1333, and 12-C from its parent logical domain (parent workgroup C (77) and grandparent workgroup A (75)); it is also inherits policy 12–13 from its topological parent.

When multiple policies are operating on a single object, either through inheritance from parent domains or direct attachment to the object, the possibility of conflict between the policies arises. The minimal conditions for determining that two or more policies are in conflict are as follows:

1. they operate on the same or intersecting sets of objects, AND
2. they have overlapping schedules.

The policy management system detects and resolves conflicts in real time, as policies become active at their scheduled enforcement times, i.e., the scheduled event is a trigger which activates the policy driver to enforce a policy, at which time any conflicts between active policies must be resolved. Whenever a policy becomes active (or inactive), all of the currently active policies operating on the affected object(s) are re-evaluated to identify and resolve among the (new) set of active rules for the object(s).

In this embodiment, by definition, inbound policy rules do not conflict with outbound rules.

An outbound conflict exists when policies have:
1. same source object, AND
2. same or intersecting destination object(s), AND
3. overlapping schedule.

An inbound conflict exists when policies have:
1. same destination object, AND
2. same or intersecting source object(s), AND
3. overlapping schedule.

For any policy object there are two possible sets of active policy rules:
1. Those that are either directly attached to the object or inherited from logical workgroup parents, and
2. Those that are inherited from the topological group parent.

Any rules in the latter category are naturally inherited by an individual object attached to the network in the affected address (topological) range. Conversely, rules which apply to logical groups of objects or users are designed to apply to the object regardless of the location in which it is attached to the network.

Conflicts must be resolved within each category (logical and topological). From FIG. 11, active policies C-1333 and CD (both underlined in active policy box 105) are in conflict on workgroup C because the destination object sets intersect. In each of end stations -tignes (83), -aspen (84) and user Joe (85), the conflict is resolved in favor of policy C-1333.

In this embodiment, location-independent (i.e., logical) rules prevail over location-dependent (i.e., topological) rules. Thus, any conflict between the active policies 12–13 (topological) and C-1333 (logical) operating on end station -tignes (depicted in FIGS. 10–11) is resolved in favor of policy C-1333.

Recall that the first condition for a conflict to be present between policy rules is that both the source and destination object sets must intersect. Conflict resolution is only performed for the intersection of these sets. If the sets intersect entirely, then it can be said that the affected object sets are identical, and resolution is only performed at the level of that object set. Thus, the conflict in FIG. 11 between active policies C-1333 and CD is resolved at workgroup C (77) and is not actually inherited by elements -tignes, -aspen, and Joe. However, if the intersection is not complete, then resolution is performed for each individual object in the intersection. This applies to each of the source and destination object sets, and it guarantees that the correct rule is applied for each source-destination combination.

Figure 12:
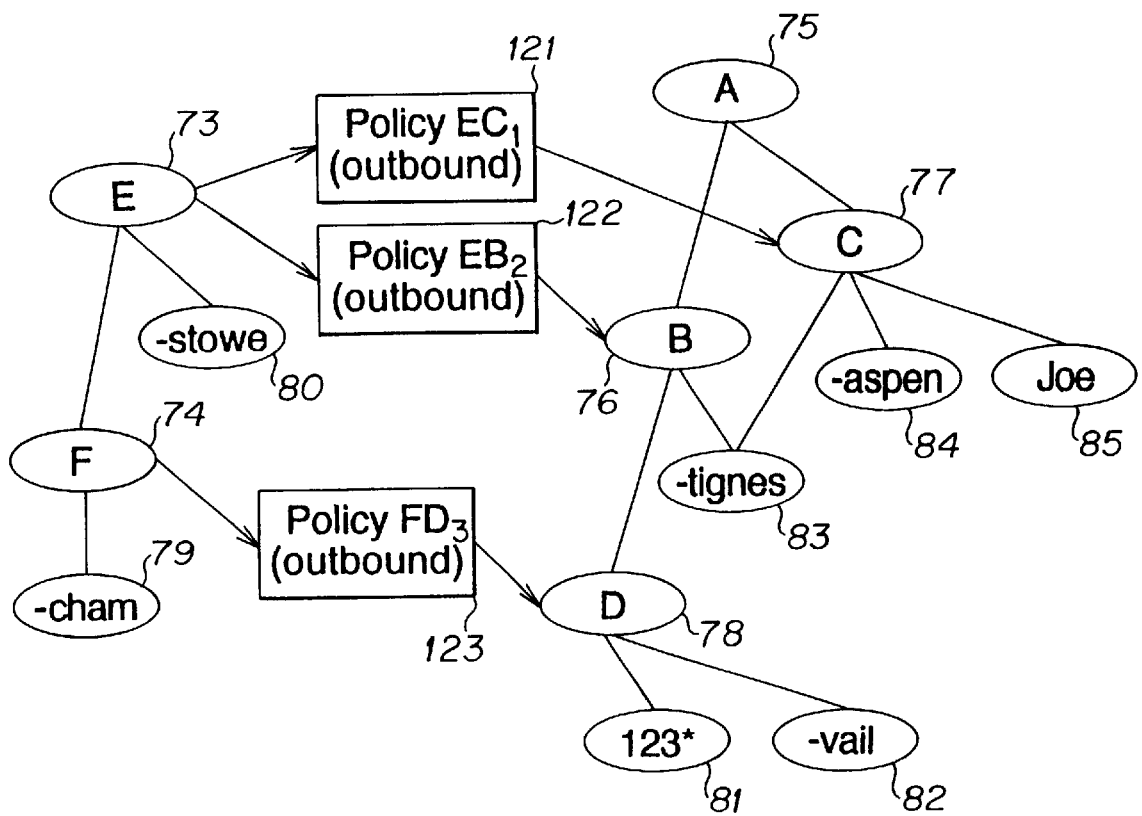
FIG. 12 is a schematic illustration of a logical domain of FIG. 8 with policies added.

To illustrate this, consider the example shown in FIG. 12, which duplicates the logical domain of FIG. 8, but now adds the policies 121–123. The two policies $EC_1$ (121) and $EB_2$ (122) are in conflict at the source workgroup E (73) because the two destination workgroups B (76) and C (77) have a non-null intersection: $\{B \cap C\} = \{tignes\}$. The conflict is thus resolved with respect to -tignes (83) only. The other destination elements will be affected with the appropriate policy. That is, policy $EC_1$, will be applied to all source-destination pairs ($\{E\}$, $\{\{C\}-\{C \cap B\}\}$)=($\{E\}$,$\{aspen,Joe\}$) and policy $EB_2$ will be applied to all source destination pairs ($\{E\}$, $\{\{B\}-\{B \cap C\}\}$)=($\{E\}$,$\{D\}$).

For the pair ($\{E\}$,$\{B \cap C\}$)=($\{E\}$, $\{tignes\}$), the conflict between $EC_1$ and $EB_2$ is resolved. Possible methods of resolving the conflict are discussed in the following section 3.1. The result of that resolution, ($EC_1$ v. $EB_2$), is applied to ($\{E\}$, $\{tignes\}$).

Table 1 below summarizes the resolution:

TABLE 1

| | Workgroup E: Active Policies | |
|---|---|---|
| Policy | (Source, Destination) | Expanded Pairs |
| $EC_1$ | ($\{E\}$, $\{C\}-\{C \cap B\}$) | (stowe, aspen), (stowe, joe) ($\{F\}$, aspen), ($\{F\}$, Joe) |
| $EB_2$ | ($\{E\}$, $\{B\}-\{B \cap C\}$) | (stowe, $\{D\}$) ($\{F\}$, $\{D\}$) |
| $EC_1$ v. $EB_2$ | ($\{E\}$, $\{B \cap C\}$) | (stowe, tignes) ($\{F\}$, tignes) |

To complete the scenario, on the source side, these conflict resolution results are inherited by all children of the source workgroup. Thus, the policies $EC_1$, $EB_2$ and ($EC_1$ v. $EB_2$) are inherited from $\{E\}$ by its children $\{F\}$ and stowe, with their resolved destination objects.

At each level of inheritance, new conflicts are detected and resolved. So in this scenario, another conflict is detected and resolved at workgroup F. Table 2 illustrates all of the policies inherited and attached directly to F.

TABLE 2

| | Workgroup F: Inherited Policies | |
|---|---|---|
| Policy | (Source, Destination) | Expanded pairs |
| $EC_1$ | ($\{F\}$, $\{aspen, Joe\}$) | (cham, aspen), (cham, Joe) |
| $EB_2$ | ($\{F\}$, $\{D\}$) | ((cham, 123), (cham, vail)) |
| $EC_1$ v. $EB_2$ | ($\{F\}$, $\{tignes\}$ | ($\{F\}$, tignes) |
| $FD_3$ | ($\{F\}$, $\{D\}$) | ((cham, 123), (cham,vail)) |

At this level, policy $FD_3$ conflicts with inherited policy $EB_2$ because the source objects are the same (F) and the destination objects (workgroup D for both policies) intersect. The conflict is resolved with respect to D so that the result ($EB_2$ V. $FD_3$) is applied to ({F}, {D}). The results are summarized in Table 3 below:

TABLE 3

Workgroup F: Active Policies

| Policy | (Source, Destination) | Expanded pairs |
|---|---|---|
| $EC_1$ | ({F}, {aspen Joe}) | (cham, aspen), (cham, Joe) |
| $EC_1$ v. $EB_2$ | ({F}, {tignes}) | ({F}, tignes) |
| $FD_3$ v. $EB_2$ | ({F}, {D}) | ((cham, 123), (cham, vail)) |

3.1 Conflict Resolution Methods

Conflicts between policy rules may be resolved in one of the following ways, each of which is described in separate subsections below:

a. By using priority to determine prevalence between conflicting policy rules;
b. By creating a new resolution policy from conflicting policies; or
C. By using projection to determine prevalence among policy attributes.

3.1.a Priority

In this method of conflict resolution, a user assigned relative priority for each of the conflicting rules is compared. The rule with the higher priority assignment is the prevalent one; only the prevalent policy rule is dispatched for enforcement.

Each policy rule created has a unique priority relative to all other policy rules. The relative priorities of policy rules may be manipulated by the user to establish an order of prevalence among selected policy rules in cases of policy conflict. The priorities of the policy rules shown in FIGS. 9–12 are given by a numeric subscript in each policy rule name, e.g., policy $AA_1$ has priority over policy $CD_2$, policy $CD_2$ has priority over policy $12$-$C_3$, etc. The priorities are shown here as absolute numbers for simplicity's sake. In reality, policy priorities are not absolute numbers, but are relative to each other. Notice that the list of active policies inherited by groups and end stations in FIGS. 10–11 are shown in order of priority.

Table 4 displays the active policies for workgroup F, with conflicts resolved by priority.

TABLE 4

Workgroup F: Active policies resolved by priority

| Policy | (Source, Destination) | Expanded pairs |
|---|---|---|
| $EC_1$ | ({F}, {aspen, Joe}) | (cham, aspen), (cham, Joe) |
| ($EC_1$ v. $EB_2$) → $EC_1$ | ({F}, {tignes}) | ({F}, tignes) |
| ($FD_3$ v. $EB_2$) → $EB_2$ | ({F}, {D}) | ((cham, 123), (cham, vail)) |

3.1.b Resolution Policy

The priority-based resolution process described above determines prevalence between entire policies. The resolution process described here is similar; however instead of using a single priority value to evaluate entire policies, each of the individual attributes inside the policies are evaluated and compared. The prevalent attribute values are combined to form a new policy rule, comprised of only those attribute values which prevail. The priority values used to determine each attribute's prevalence is also predetermined by the user of the policy management system. This allows a new policy to be generated based on a known value system.

This method of conflict resolution can be used just like priority conflict resolution, to generate a resolved policy rule to be dispatched for enforcement at a policy's scheduled start time.

3.1.c Projection

In the "policy projection" method, a user does not actually set priorities for individual attributes of policies, but sets parameters which dictate whether or not policy attributes may be overridden by those in other inherited policies. The policy attributes may be defined with "don't care" values when it is preferred that the value be derived from the inherited policies.

Policy projection is used for deriving the enforceable "operating policy" which actually governs network connections as they are established. This is a means for enforcing policies of varying scopes, from broad topological domains down to individual fully-expressed end-station addresses, and allows for arbitration between location-dependent and location-independent policy rules. For example, a location independent policy applied to an individual user will travel with that user from domain to domain, regardless of where the user is attached to the network. An administrator may prefer that certain attributes of the individual's policy be derived from the location at which the user is accessing the network, or the administrator may prefer that certain attributes of the policies governing that domain not be overridden by sub-domains or logical entities.

Figure 13:
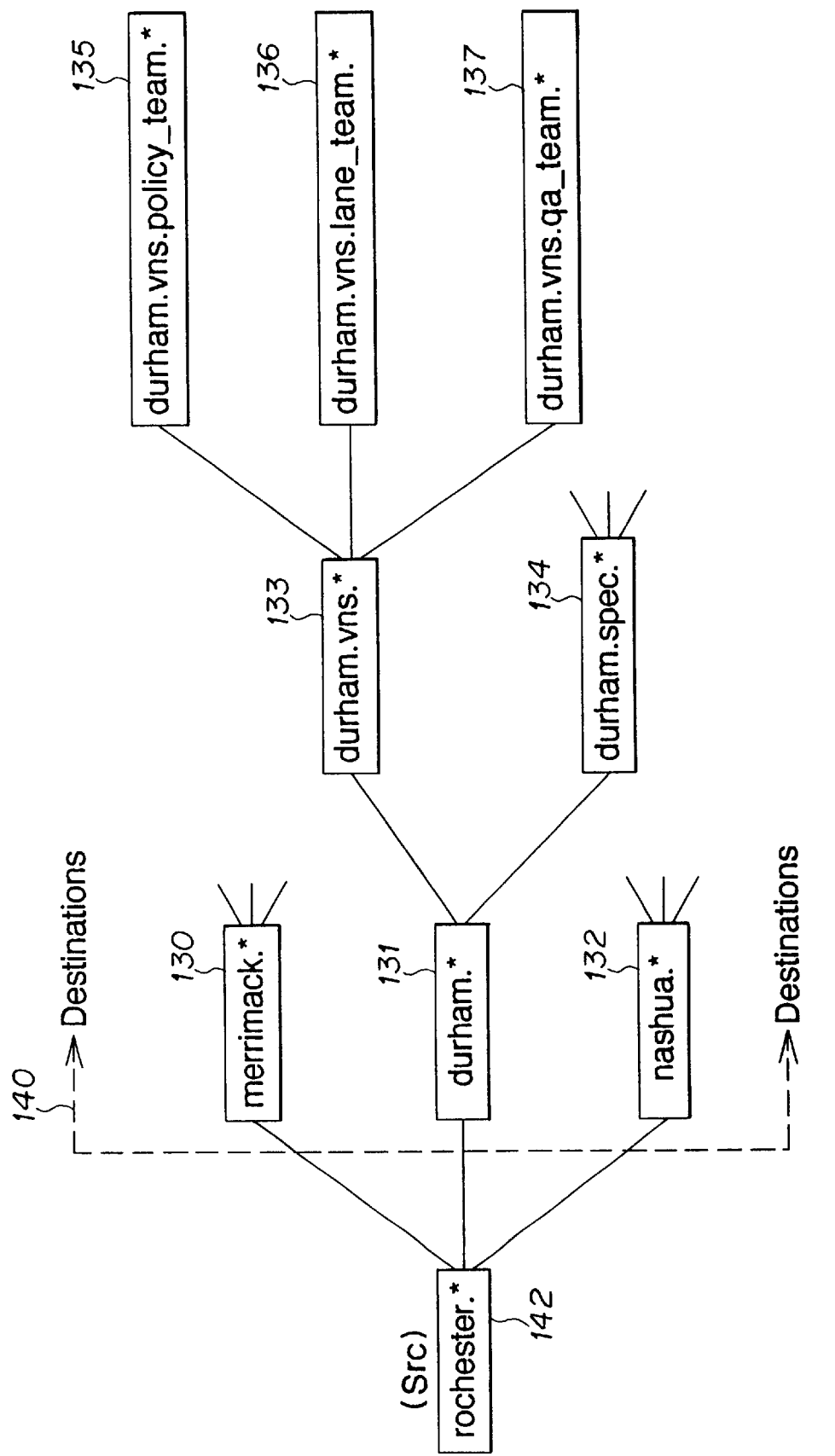
FIG. 13 is a schematic illustration of a hierarchal relationship between workgroups in a connection management embodiment of the present invention.

The following example illustrates the operation of policy projection. FIG. 13 shows eight destination domains 130–137 (to the right of the dashed line 140) with respect to one source domain 142, e.g., "rochester.*". The goal is to define an operating policy for a call originating at the source (rochester.*) and terminating in one of the destination domains. According to policy projection, a workgroup (domain) inherits all of the policies of its ancestors, but is allowed to override some of these policies. When a policy term is represented by a "don't-care" entry, it means that the value of this term can be derived from one of its ancestors. Policies are explicitly defined in a workgroup when at least one of its terms (attributes) is different from that of an ancestor. The "operating policy" is obtained by projecting each policy term towards its most distant ancestor until all "don't-care" entries have been replaced by actual parameter values For example, consider the following workgroups shown in FIG. 13:

(a) durham.* (131), i.e., all end-stations in Durham;
(b) durham.vns.* (133), i.e., all end-stations in Durham that are in the VNS group; and
(c) durham.vns.policy_team.* (135), i.e., all end-stations in Durham that are in the Policy Team subgroup of the VNS group.

Assume that the policy term for workgroup (131) is given by:

$$PT_{131} = \{P_1, P_2, P_3, P_4 P_5\}.$$

If only $P_5$ is changed for workgroup (133), the policy term will be entered as follows:

$$PT_{133} = \{—,—,—,—,P_5'\}$$

where—denotes "don't care," and signifies inheritance. Assume also that the policy term for workgroup (135) varies from that of (133) in $P_3$. The entry for (135) will be as follows:

$$PT_{135}=\{—,—,P_3',—,—\}$$

When the rule for (135) is executed, the values of $P_1,P_2,P_4$ and $P_5'$ fall back on those of (133). However, because "don't care" entries are also made in $PT_{133}$ for $P_1,P_2$ and $P_4$, their values fall back on those of (131). The operating policy term will then be:

$$PT_{135}=\{P_1,P_2,P_3',P_4,P_5'\}$$

This illustrates the concept of policy projection. Because the same end-station can be in more than one workgroup, there is hereinafter defined a conflict resolution scheme for determinating the operating policy term when the end-station belongs to multiple workgroups.

3.2 Example of Connectivity Management in a Switched Network Environment

The following example illustrates a policy-based management system for determining connectivity in a switched network environment. The system allows virtual (i.e., logical) networking across multiple switching technologies, and enables the enforcement of policies which define resource usage. A number of terms are first defined, followed by a set of rules for resolving conflicts.

The following definitions apply in this example:
Policy

A policy is a rule attached to an object and has one or more attributes whose values can be set to any level within predefined boundaries. Examples of policy attributes include bandwidth, number of sessions, and link-type (secure, encrypted, non-tariffed). Policies can be created, destroyed and queried.

Source (or outbound) policies specify the rules for handling traffic originating from a specified source.

Destination (or inbound) policies specify the rules for using a resource at a specified destination.
Policy Term Policy term is a set of all policies required to carry out a task. For example, if a user wishes to set up a connection between point A and point B, he may require a policy for bandwidth allocation ($P_B$), a policy for route selection ($P_R$), and a policy for the holding time of the connection ($p_H$), wherein the policy term is defined as:

$$PT=\{P_B,P_R,P_H\}$$

Rules

A rule provides that if the values of select attributes fall within a specified range, then a certain action is taken. In this embodiment, there are four key attributes which are included in a given rule: source address, destination address, service, and arbitration. The source address defines the source of the desired connection. The destination address defines the destination of the desired connection. The service defines the type of connection desired, e.g., data, video quality, voice, etc. Arbitration refers to the method of how conflicts are to be resolved. A complete instance of the four key attributes is also referred to as a target, and represents a desired connection.
Rule Set A rule set is a group of rules having the same structure. There are two rule sets defined: location-based, and non-location-based.

Each rule in a "location-based" rule set has the same source address. An entity governed by a location-based rule set can only use the resource (e.g., network) at the source specified in the source address.

Each rule in a "non-location-based" rule set has a different source address. This rule set is used for nomadic users that are allowed to access the network from different locations. The applicable policies may vary with the user's location in the enterprise network.
End-Station Workgroups There are two types of workgroups defined for end-stations: numbering plan workgroups and generic workgroups.

Numbering-plan workgroups are collections of end-stations within a topological domain, defined by a set of address prefixes. Any end-station which connects to the network automatically inherits the prefix from the switch to which it is attached, and will fall into the numbering-plan workgroups which encompass that address. The groups are hierarchial; a group defined by a shorter prefix will encompass any longer-prefix group that matches the shorter prefix. For example, the workgroup "durham.vns.*" is the parent of the workgroup "durham.vns.policy_team.*." FIG. 13 illustrates the targets for a given source and a given service in a numbering-plan scheme.

Generic workgroups are arbitrary collections of end stations. This implies that an end station can be moved anywhere within the domain as opposed to the geographically-defined boundaries associated with the numbering-plan scheme.

The rule set for numbering-plan workgroups is always location-based.

The rule set for generic workgroups is non-location-based.
User Workgroups

A user workgroup is an arbitrary collection of users; it is similar to a generic workgroup in that it is not location-based. Thus, users can access the network from all locations permitted by their rule set to all locations permitted by their rule set. For example, a virtual user group can be defined for a group of users who are allowed to access the network from anywhere in New Hampshire to anywhere in New England. Similarly, a virtual user workgroup can be defined for a group of salespeople who are allowed to access the network from anywhere in the world to anywhere in the world.

Once a user's location is fixed, the policies that apply become location-dependent. For example, a user X may call any user in London, England, with unlimited bandwidth for a particular service when he/she is in London (i.e., a local call). However, when user X is in Durham, N.H., he/she may have to use a limited bandwidth for a call to the same person in London for the same service.

User workgroups are by definition non-location-based unless specified otherwise. For example, the source address attribute in a rule set for a user named "John" may include: John@Durham, John@Nashua, John@Rochester, and John@Merrimack, when all of these apply to the user John; that is, the user Ibe is allowed to access the network from Durham, Nashua, Rochester and Merrimack.

User workgroup based policy management requires that the user be authenticated by an authentication server. Assume that a particular nomadic user, called Steve, is currently located in domain G. Using an end-station in domain G, Steve logs onto an authentication server which downloads the rule set for Steve related to domain G. Thereafter, Steve will be bound to the rules that are defined for the source address G.

Once authenticated, the user's workgroup rule set is automatically attached to the end-station at which the user has been authenticated. The user's rule set supplements that of the end-station. In this way, the end-station's rule set can be considered the default rule set while that of a user authenticated on the end-station is the specific rule set.

A default "home" location can be defined for a nomadic user. The home server is the repository for the user's rule set and is responsible for transferring the appropriate rules to the user's current domain.

Outbound Policies

The rules for an outbound policy include as key attributes: {source address, destination address, service, arbitration}.

The following is an exemplary set of outbound policies and their attributes:
1. Access Policy: Determines the locations a user can access; includes. "allowed," "not allowed," "don't care."
2. Usage Policy: Determines the network resources a user or workgroup may consume. It includes:
   a. Maximum Connection Count (i.e., # of connections a user may establish under the service)
   b. Maximum Bandwidth (for all sessions from a user to all target workgroups)
   c. Maximum Connect Time
3. Routing Policy: Determines how the route for the workgroup is to be selected. It includes the following:
   a. Optimization Method (Cost vs. Delay)
   b. Designated Transit List (DTL)
   c. Restricted Transit List (RTL)
   d. Maximum Path Cost
   e. Link Constraints List
      1. Secure (Required, Requested, Not-Required)
      2. Encrypted
      3. Non-Tariffed
4. Administrative Policy
   a. Audit Trail Flag (Yes or No)
   b. Connection Priority
   c. Checkpoint Timer (checkpoint usage at this interval)
5. Connectionless-Access Policy: intended for connection-unaware clients and includes the following:
   a. Inactivity Timer (break connection when inactive for this amount of time)
   b. Bandwidth to allocate It is not necessary to use all of these policies, and additional policies may be added.

Inbound Policies

The key attributes of an inbound policy are: {destination, source, service, arbitration}.

The following are exemplary inbound policies and their attributes:
1. Access Permission: Determines if the user can access the destination; includes "allowed," "not allowed," "don't care"; note if there is a conflict between the access permission of the inbound and outbound rules, then if either value is "not allowed," then the "not allowed" value is chosen; and if either value is "don't care," then the other value is chosen.
2. Maximum Connection Time: Given that access permission is granted, this is the maximum time the user is allowed to use the resource.
3. Maximum Connection Count: The maximum number of connections the user may establish.
4. Audit Trail Flag (Yes or No)
5. Connection Priority Again, not all of these policies are required, and additional policies may be added.

Conflict Resolution

The potential for conflict exists between inbound and outbound rules, location and non-location based rules, and users (or end-stations) in one or more workgroups. The following example illustrates five exemplary conflict resolution rules for resolving such conflicts.

FIG. 14 is intended to illustrate various methods of conflict resolution for a desired connection from John to Steve. The network 150 (shown in FIG. 14a) is partitioned into a plurality of end-station workgroups: ES-A, ES-B, ES-C, ES-D, ES-E, ES-F, and ES-G. A user John 151, located in Durham, which is part of ES-A, wishes to call user Steve 152, in Nashua, which is part of ES-G.

FIG. 14b is a flow diagram illustrating the possible conflicts. On the source side (154), conflicts must be resolved between the three outbound policy terms, ES-A (155), U-A (156), and U-B (157), in order to provide an effective outbound policy term. ES-A outbound policy term is applicable to end-stations in workgroup A, and includes both location based rules and non-location based rules. Because John is a member of two user workgroups, U-A and U-B, there are also provided outbound policy terms for each of these user workgroups.

In this example we use conflict resolution rule 1 (158), CR-Rule 1, if a conflict arises between domain elements having a hierarchial relationship; for example, if user group B is a child of parent user group A. Alternatively, if user groups A and B have a peer relationship, we use conflict resolution rule 3, (159), CR-Rule 3, to resolve the conflict. We use CR-Rule 5 (160) to resolve conflicts between the end-station and user workgroups for the source.

In regard to the destination side (162), there is an ES-G inbound policy term (163) with both location-based rules and non-location based rules, based on Steve's present location in domain G. In addition, if user Steve is a part of user workgroups H and I, there are inbound policy terms defined for each of these user workgroups (164 and 165, respectively). We use CR-Rule 1 (158) to resolve parent-child conflicts between the user workgroups if applicable; if the user workgroups have a peer relationship, we use CR-Rule 3 (159) for conflict resolution of destination policies between peer workgroups. We use CR-Rule 5 (167) for potential conflicts between end-station and user workgroups.

A policy term (155, 163) is determined separately for each of the inbound and outbound portions of the connection. The overall operating policy term is derived from both of the inbound and outbound policy terms. In this example, where no conflict is detected between the same, the outbound policy term is accepted. When conflict is detected, conflict resolution rule 2 (168), CR-Rule 2, is used to resolve the same.

CR-Rule 1 is used to resolve conflicts between entities having a hierarchial relationship (e.g. parent-child relationship) in which conflicts are resolved by a priority scheme that assigns a higher priority to a descendant than its ancestor. As previously described, the policy terms may be defined by "don't-care" entries, in which case the policy term is derived from one of its ancestors. The operating policy term is obtained by "projecting" the policy terms toward the most distant ancestor until all don't-care entries have been replaced by actual parameter values.

CR-Rule 2 is used for resolving conflicts between inbound and outbound policies. The following rules are observed:
1. For routing, only outbound policies considered.
2. Access is granted if both inbound and outbound policies allow it.

3. An audit trail is done if either the source or the destination policy says "Yes".
4. For other policies, the liberal versus conservative rules defined below apply.

CR-Rule 3 applies to source policies between peer workgroups. The following rules are observed:
1. A liberal policy that picks the highest among the conflicting values.
2. A conservative policy that picks the lowest among the conflicting values.

Another method of resolving conflicts between attribute values in inbound and outbound policies is resolution based on a preset bias level; if the bias level is "plus," then the greater of the attribute values is chosen; if the value is "minus" then the lesser of the two attribute values is chosen.

Figure 15:
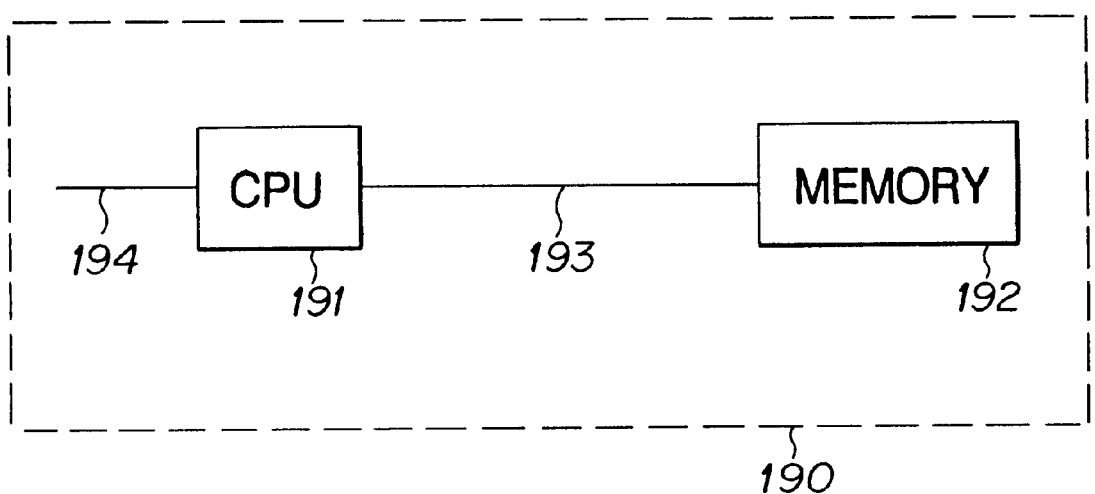
FIG. 15 is a schematic illustration of a computer apparatus.

Any of the above embodiments may be implemented in a general purpose computer 190 as shown in FIG. 15. The computer may include a computer processing unit (CPU) 191, memory 192, a processing bus 193 by which the CPU can access the memory 192, and access to a network 194. The invention may be a computer apparatus which performs the functions of any of the previous embodiments. Alternatively, the invention may be a memory, such as a floppy disk, compact disc, or hard drive, which contains a computer program or data structure, for providing general purpose computer instructions and data for carrying out the functions of the previous embodiments.

Having thus described various illustrative embodiments of the invention, various modifications will occur to those skilled in the art that are intended to be within the scope of the present invention. Thus, the foregoing description and accompanying drawings are provided by way of example only and are not intended to be limiting. The invention is defined by the following claims.

What is claimed is:

1. A system for determining an enforceable policy applicable to one or more network devices, the system comprising a computer-readable medium encoded with:
   a data structure defining one or more domain elements that represent one or more network devices, and defining a plurality of rule elements that define one or more actions; and
   a plurality of executable methods comprising:
      a method for attaching one or more of the plurality of rule elements to the one or more of the domain elements to create at least one policy.

2. The system of claim 1, wherein the plurality of executable methods further comprises:
   a method for determining whether at least one conflict exists between at least two of the policies; and
   a method for resolving the at least one conflict to produce one or more enforceable policies.

3. The system of claim 2, wherein the method for resolving conflicts comprises resolving the at least one conflict when any policy becomes active at a scheduled event.

4. The system of claim 1, wherein the one or more domain elements include both location-based groups and nonlocation-based groups.

5. The system of claim 4, wherein the location-based groups are topological groups and the nonlocation-based groups are selected from the group comprising logical end systems groups and logical user groups.

6. The system of claim 2, further comprising a method for executing at least one of the one or more enforceable policies.

7. The system of claim 1, the one or more domain elements include at least one of topological and logical domains.

8. The system of claim 2, wherein the method for determining whether at least one conflict exists comprises determining whether at least two policies have an overlap in an attribute of the domain elements and scheduling.

9. The system of claim 2, wherein the one or more domain elements include at least one attribute and at least one attribute value, the rules specify attribute values for the one or more domain elements, and the method for determining whether at least one conflict exists includes comparing the attribute values.

10. The system of claim 9, wherein the rules are "if/then" rules having the attribute values on the "if" side of the rule and the one or more actions on the "then" side of the rule.

11. The system of claim 1, wherein the one or more actions include at least one of: permission or forbiddance of an operation on the one or more network devices, modification of the one or more domain elements, display of a message, and entry in a log.

12. The system of claim 2, wherein the method for determining at least one conflict for a domain element E comprises:
   collecting all domain elements D of which E is a member;
   collecting the rules that apply to each domain element D, if any, and the rules that apply to E, if any; and
   determining whether any conflicts exist between the collected rules.

13. The system of claim 2, wherein the method for resolving the at least one conflict comprises determining at least one prevalent policy.

14. The system of claim 2, wherein the method for resolving the at least one conflict comprises determining at least one prevalent policy made up of prevalent attributes of the one or more domain elements.

15. The system of claim 2, wherein the one or more domain elements are hierarchical and the method for resolving at least one conflict comprises resolving any conflicts at the highest level of the hierarchy at which the conflict arises.

16. A system for determining an enforceable policy applicable to one or more network devices, comprising a computer-readable medium encoded with:
   a data structure comprising a policy space, the policy space including domain elements representing network devices and groups of network devices, and rule elements defining actions; and
   a plurality of executable methods comprising:
      a method for attaching one or more of the rule elements to one or more of the domain elements to create policies;
      a method for determining whether conflicts exist between the policies; and
      a method for resolving the conflicts to produce one or more enforceable policies,
   wherein the method of resolving conflicts includes at least one of:
      selecting a policy that issues from a pre-defined priority;
      selecting a policy that issues from the least specific domain element among the conflicting policies;
      selecting a policy that satisfies a largest number of conditions included in the conflicting policies; reporting the conflicting policies to a user and allowing the user to adjudicate between the conflicting policies.

* * * * *